No. 884,264. PATENTED APR. 7, 1908.
H. H. CARPENTER, DEC'D.
G. A. CARPENTER, ADMINISTRATRIX.
STORAGE BATTERY.
APPLICATION FILED FEB. 1, 1906. RENEWED APR. 4, 1907.
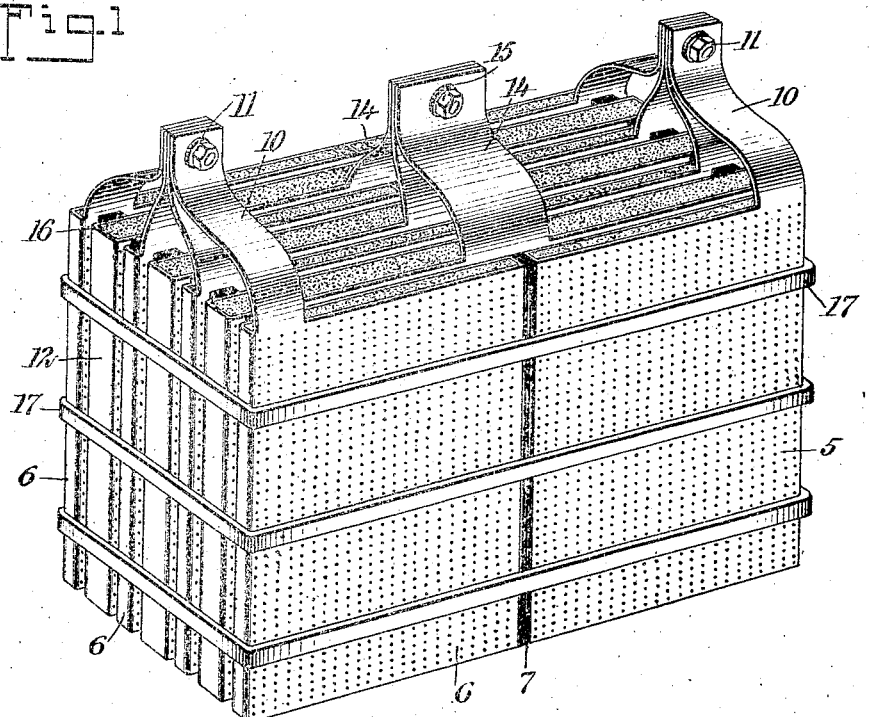
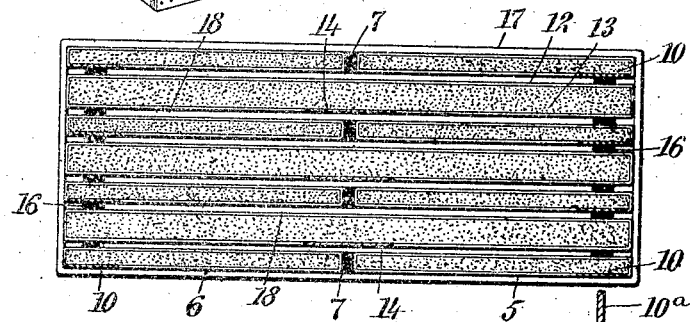
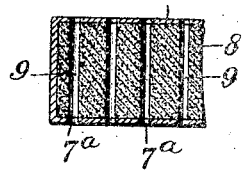
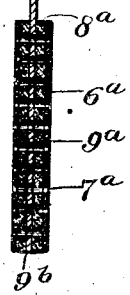
WITNESSES:
J. A. Brophy
Walton Harrison.
INVENTOR
Georgie Anna Carpenter Administratrix of the
Estate of Hiram Henry Carpenter, deceased.
BY
Munn & Co
ATTORNEYS

UNITED STATES PATENT OFFICE.

GEORGIE ANNA CARPENTER, OF NEW YORK, N. Y., ADMINISTRATRIX OF HIRAM HENRY CARPENTER, DECEASED, ASSIGNOR, BY MESNE ASSIGNMENTS, TO AMERICAN BATTERY COMPANY, OF CEDARHURST, NEW YORK, A CORPORATION OF NEW YORK.

STORAGE BATTERY.

No. 884,264.

Specification of Letters Patent.

Patented April 7, 1908.

Application filed February 1, 1906, Serial No. 298,957. Renewed April 4, 1907. Serial No. 366,410.

*To all whom it may concern:*

Be it known that I, GEORGIE ANNA CARPENTER, a citizen of the United States, and a resident of the city of New York, borough of Manhattan, in the county and State of New York, administratrix of the estate of HIRAM HENRY CARPENTER, deceased, late a citizen of the United States, and late a resident of the city of New York, borough of Manhattan, in the county and State of New York, as by reference to the duly certified copy of letters of administration hereto annexed will more fully appear, and who did in his lifetime invent a new and useful Improvement in Storage Batteries, do hereby declare the following to be a full, clear, and exact description of said invention.

The invention consists in the form, arrangement and proportions of certain parts used in a storage battery, whereby certain advantages are attained as hereinafter described.

Reference is to be had to the accompanying drawings forming a part of this specification, in which similar characters of reference indicate corresponding parts in all the figures.

Figure 1 is a perspective view showing the positive and negative grids of a storage battery cell as removed from the containing vessel but otherwise assembled and ready for use; Fig. 2 is a horizontal section through the same, taken upon a plane slightly above the upper surface of the grids; Fig. 3 is a fragmentary section through one form of positive plate; and Fig. 4 is a fragmentary section through another form of negative plate.

The negative pole electrodes are shown at 5, 6, and are arranged in pairs as indicated in Fig. 2, the plates of each pair being separated by a rod 7 of hard rubber, vulcanite, or other insulating material.

Where the form indicated in Figs. 1, 2 and 3 is used, the electrode is provided with perforations $7^a$ and is also provided with a filling 8 having holes 9 therethrough, these holes being in exact registry with the holes $7^a$ as indicated in Fig. 3.

In the form shown in Fig. 4 the electrode $6^a$ is provided with perforations $7^a$ and is filled with active material $8^a$ having perforations or holes $9^a$ registering with the perforations $7^a$. In this case a central sheet of metal $9^b$ corresponding in substance to the electrode $6^a$, passes centrally through the same and through the active material $8^a$.

The terminals of the electrodes 5, 6, and $6^a$ are shown at 10, $10^a$, and secured together and provided with a binding post 11 as indicated in Fig. 1. Positive pole electrodes are shown at 12 and are of double the width of the negative pole electrodes 5 and 6 as will be understood from Fig. 2. Each positive pole electrode 12 is perforated as shown and is filled with active material 13. The preferred active material is cerussite, but any other active material may be employed. The several positive plates are connected together by strips 14, the latter being provided with a binding post 15. A number of comparatively thin bars 16 of insulating material, preferably rubber, are used to space the electrodes apart as indicated in Fig. 2. A number of resilient bands 17 are placed around the plates so as to hold the same firmly together. When the several plates are assembled as indicated in Fig. 2, there are passages 18 intermediate of the electrodes, and through these passages the exciting liquid is free to circulate.

This invention is in part based upon the discovery that if the negative pole electrodes be made of comparatively small size and double in number they afford certain advantages. Among these advantages are the following: 1. The plates of both kinds may be formed with greater rapidity; 2. The ohmic resistance of the cell is diminished; 3. The capacity of the cell measured in watt hours is increased; and 4. The charging and discharging of the cell may be regulated to greater advantage by changing the relative aggroupment; and 5. The amperage of the battery is doubled.

With a battery thus constructed the negative pole electrodes at one end of the cell, for instance, those at the right of Fig. 2, may be connected up with the positive pole electrodes by merely treating the middle binding screw 15 and the right hand binding screw 11 as the terminals of the battery. When the negative pole electrodes at the right are thus exhausted the negative connection may be shifted over to the other negative binding post 11 and a discharge renewed until the rest of the negative pole electrodes are exhausted. If desired, the two binding posts 11 may be both connected to the same wire, constituting one terminal of the system to be operated upon, the binding post 15 being connected to the opposite terminal. In this case all of the negative electrodes do their work at the same time. The number of amperes, when all of the negative plates are in action, is just double the number when only one-half of the negative plates are active. Each positive pole electrode and its contents together constitute a plate. Each negative pole electrode and its contents also constitute a plate. The arrangement also increases the duration of the battery if the negative pole electrodes are not all discharged at once. While the drawing shows only two negative electrodes for each positive electrode this arrangement is not to be regarded as a limitation.

The invention is not limited to the use of flat casings or envelops as electrodes. The casings or envelops may be of various shapes and proportions.

Having thus described my invention, I claim as new and desire to secure by Letters Patent:—

1. In a storage battery, the combination of a plurality of negative plates arranged in pairs, the individual plates of each pair being insulated from each other, connections for joining together one plate of each pair, separate connections for joining together the other plate of each pair, a plurality of positive plates sandwiched intermediate of said negative plates, one positive plate having a surface substantially equal to that of one pair of said negative plates, and connections for joining together said positive plates.

2. In a storage battery, the combination of a plurality of negative plates arranged edge to edge in pairs, connections for joining together one plate of each pair, means for insulating from each other the plates of each pair, separate connections for joining together the several other plates of each pair, a plurality of positive plates sandwiched intermediate of successive pairs of said negative plates, spacing rods of insulating material disposed intermediate of said positive plates and said negative plates, connections for joining together said positive plates, and rubber bands encircling both said positive plates and said negative plates and holding the same firmly together.

3. In a storage battery, the combination of a plurality of plates of one sign arranged in pairs, the individual plates of each pair being insulated from each other, connections for joining together one plate of each pair, separate connections for joining together the other plate of each pair, and a plurality of plates of a different sign connected together and sandwiched intermediate of said first-mentioned plates, said plates of said different sign each having a surface substantially equal to that of one pair of said first-mentioned plates.

4. In a secondary battery, a cell comprising a plate of one sign, and a plurality of plates of the opposite sign, the aggregate of the areas of the plurality of plates being substantially equal to the areas of the first-mentioned plate.

5. In a secondary battery, a plate of one sign, a plurality of plates of the opposite sign, the aggregate of the area of the plurality of plates being substantially equal to the area of the single plate, means to connect the plurality of plates, and means to insulate the plates one from the other.

6. In a storage battery, the combination of a plurality of plates of one sign arranged in pairs, the individual plates of each pair being insulated from each other, connections adapted to join together one plate of each group of pairs, separate connections joining together the other plates of each group of pairs, and a plurality of plates of a different sign connected together and alternating with said first-mentioned plates, said plates of said different sign each having a surface area substantially equal to that of one pair of said first-mentioned plates.

In testimony whereof I have signed my name to this specification in the presence of two subscribing witnesses.

GEORGIE ANNA CARPENTER,
*Administratrix of the estate of Hiram Henry Carpenter, deceased.*

Witnesses:
WALTON HARRISON,
JNO. M. RITTER.